United States Patent
Cheng et al.

(10) Patent No.: US 7,477,408 B2
(45) Date of Patent: Jan. 13, 2009

(54) SYSTEM AND METHOD FOR THICKNESS MEASUREMENT

(75) Inventors: Kai-Yu Cheng, Hsinchu (TW);
Yen-Liang Chen, Hsinchu (TW);
Hsiang-Han Hsu, Hsinchu (TW);
Yi-Ching Chen, Hsinchu (TW);
Yu-Ping Lan, Hsinchu (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 243 days.

(21) Appl. No.: 11/369,339

(22) Filed: Mar. 7, 2006

(65) Prior Publication Data
US 2007/0070360 A1  Mar. 29, 2007

(30) Foreign Application Priority Data
Sep. 23, 2005  (TW)  ............... 94132986 A

(51) Int. Cl.
*G01B 11/28* (2006.01)
(52) U.S. Cl. ................. 356/630; 356/609; 356/503
(58) Field of Classification Search ........... 356/630, 356/609, 503; 235/492, 487
See application file for complete search history.

(56) References Cited

U.S. PATENT DOCUMENTS

| | | | |
|---|---|---|---|
| 5,434,671 A | 7/1995 | Sumiyoshi et al. | |
| 6,313,915 B1 * | 11/2001 | Yanagisawa et al. | 356/614 |
| 6,628,389 B1 | 9/2003 | Akada et al. | |
| 6,636,322 B1 | 10/2003 | Terashita | |
| 6,757,062 B2 | 6/2004 | Dohi | |
| 6,847,458 B2 * | 1/2005 | Freischlad et al. | 356/503 |

FOREIGN PATENT DOCUMENTS

JP  56160631  12/1981

* cited by examiner

*Primary Examiner*—Hwa (Andrew) S Lee
(74) *Attorney, Agent, or Firm*—Alston & Bird LLP

(57) ABSTRACT

A system and a method for thickness measurement that comprises providing a first confocal microscope, emitting a first light beam from the first confocal microscope in a first direction, focusing the first beam at a first focal plane, providing a second confocal microscope, emitting a second light beam from the second confocal microscope in a second direction substantially opposed to the first direction, focusing the second beam at a second focal plane, and adjusting the relative position of the first and second microscopes by overlapping the first and second focal planes.

22 Claims, 10 Drawing Sheets

US 7,477,408 B2

SYSTEM AND METHOD FOR THICKNESS MEASUREMENT

BACKGROUND OF THE INVENTION

The present invention relates generally to optical measurement and, more particularly, to a system and method for measuring the cell gap of a liquid crystal cell.

With the advent in semiconductor processes, electronic products are increasingly required to be lightweight, compact and low profile. Consequently, the fabrication of liquid crystal display ("LCD") panels, which have been widely used in electronic products, has become more complex. An LCD panel usually comprises an upper glass substrate, a lower glass substrate and intermediate layers sandwiched between the glass layers. The intermediate layers may include a color filter layer, indium tin oxide ("ITO") layers, alignment films and a liquid crystal cell filled with a liquid crystal. The thickness or the cell gap of the liquid crystal cell is an important factor to control because the properties such as display color, response speed and orientation stability of a liquid crystal cell depend upon the cell gap. Accordingly, in order to use a liquid crystal cell, it is important to measure the cell gap.

BRIEF SUMMARY OF THE INVENTION

The present invention is directed to a system and method for measuring the thickness of an object that obviate one or more problems resulting from the limitations and disadvantages of the prior art.

In accordance with an embodiment of the present invention, there is provided an optical measuring system that comprises a first confocal microscope for providing a first light beam in a first direction converging at a first focal plane, and a second confocal microscope for providing a second light beam in a second direction substantially opposed to the first direction converging at a second focal plane.

Also in accordance with the present invention, there is provided an optical measuring system that comprises a first confocal microscope including a first objective lens for providing a first light beam in a first direction converging at a first focal plane of the first objective lens, a second confocal microscope including a second objective lens for providing a second light beam in a second direction substantially opposed to the first direction converging at a second focal plane of the second objective lens, and a device for adjusting the position of one of the first focal plane and the second focal plane along an axis defined by the first and second directions.

Further in accordance with the present invention, there is provided a method for thickness measurement that comprises providing a first confocal microscope, emitting a first light beam from the first confocal microscope in a first direction, focusing the first beam at a first focal plane, providing a second confocal microscope, emitting a second light beam from the second confocal microscope in a second direction substantially opposed to the first direction, focusing the second beam at a second focal plane, and adjusting the relative position of the first and second microscopes by overlapping the first and second focal planes.

Still in accordance with the present invention, there is provided a method for thickness measurement that comprises providing a first confocal microscope including a first objective lens, emitting a first light beam from the first confocal microscope in a first direction, focusing the first beam at a first focal plane of the first objective lens, providing a second confocal microscope including a second objective lens, emitting a second light beam from the second confocal microscope in a second direction substantially opposed to the first direction, focusing the second beam at a second focal plane of the second objective lens, and providing an object including at least one layer.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Reference will now be made in detail to the present embodiments of the invention, examples of which are illustrated in the accompanying drawings. Wherever possible, the same reference numbers will be used throughout the drawings to refer to the same or like parts.

Figure 1A:
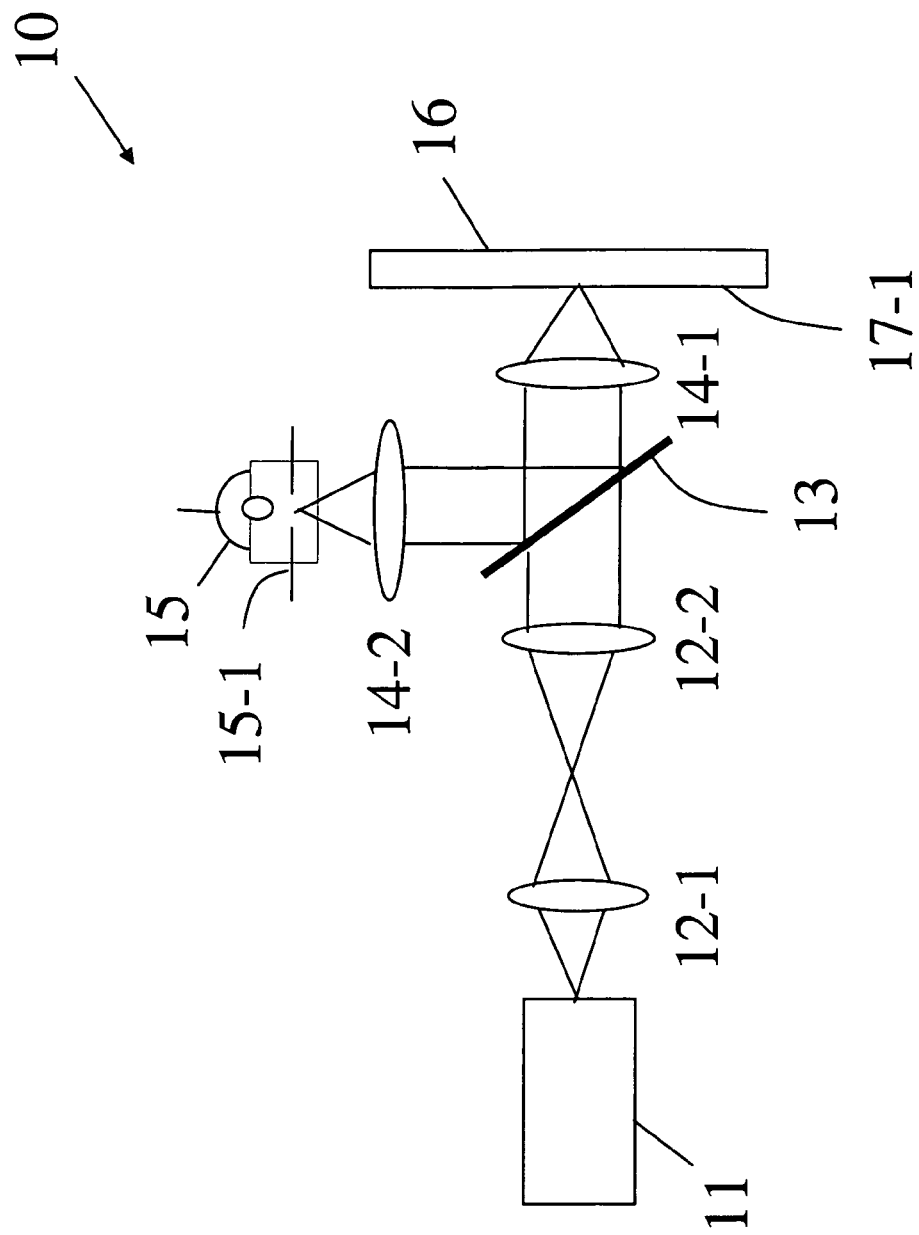
FIG. 1A is a schematic diagram of a confocal microscope suitable for use in the present invention.

FIG. 1A is a schematic diagram of a confocal microscope 10 suitable for use in the present invention. Referring to FIG. 1A, the confocal microscope 10 includes a light source 11, a first lens 12-1, a second lens 12-2, a beam splitter 13, a first objective lens 14-1, a second objective lens 14-2 and a detector 15 with a pinhole 15-1. The light source 11, first lens 12-1 and second lens 12-2 provide a laser beam toward an object 16. The laser beam, passing through the first lens 12-1, second lens 12-2, beam splitter 13, is focused by the first objective lens 14-1 on a focal plane 17-1 associated with the first objective lens 14-1, and then reflected therefrom. The object 16, which is disposed at the focal plane 17-1, is in-focus with the first objective lens 14-1. The reflected light beam, which coincides with the incident laser beam, is recollected by the first objective lens 14-1 and reflected by the beam splitter 13 toward the detector 15 through the second objective lens 14-2. Since the pinhole 15-1 is located at a focal plane associated with the second objective lens 14-2, the reflected light beam from the focal plane 17-1 is focused at the pinhole 15-1 and entirely pass to the detector 15.

Figure 1B:
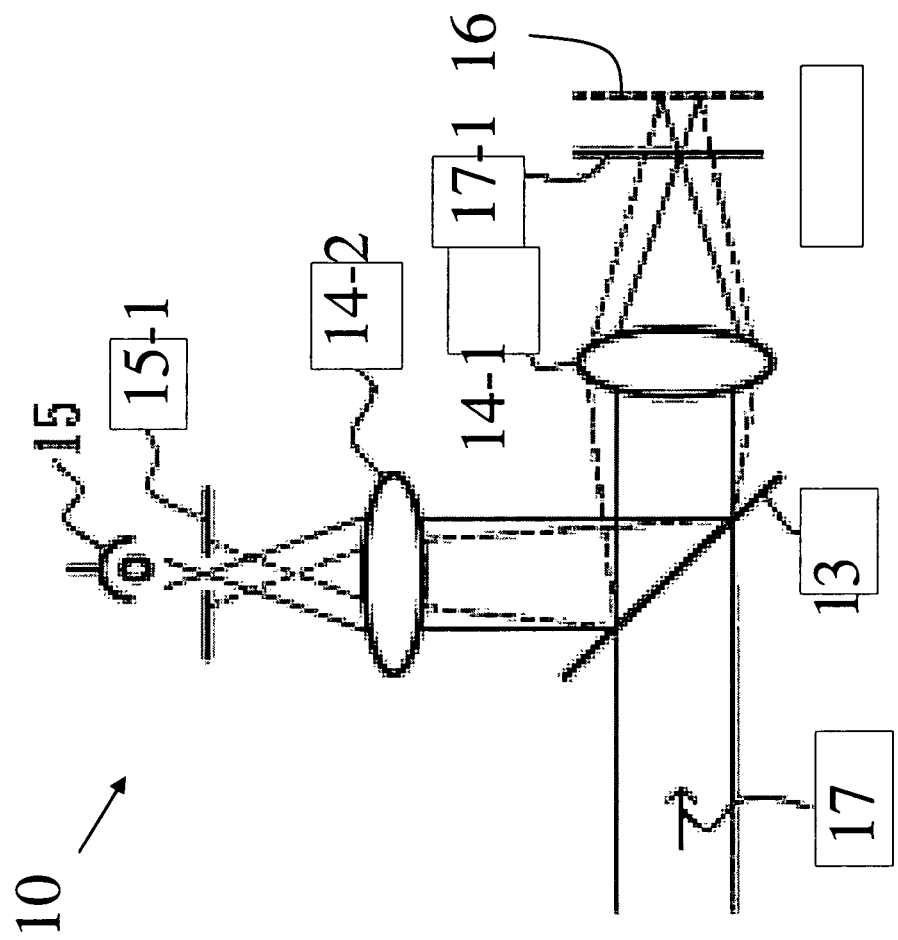
FIG. 1B is a schematic diagram illustrating an out-of-focus situation with the confocal microscope shown in FIG. 1A.

FIG. 1B is a schematic diagram illustrating an out-of-focus situation with the confocal microscope 10 shown in FIG. 1A. Referring to FIG. 1B, an incident light beam 17 is focused by the first objective lens 14-1 on the focal plane 17-1. However, since the object 16 is disposed away from the focal plane 17-1, only a portion of the reflected light beam (illustrated in dotted lines) is received by the detector 15. Specifically, a light beam from below the focal plane 17-1 comes to a focus before reaching the pinhole 15-1, and then expands out so that most of the light beam is physically blocked from reaching the detector 15 by the pinhole 15-1. In the same way, a light beam from above the focal plane 17-1 is focused behind the pinhole 15-1, so that most of light beam also hits the edges of the pinhole 15-1 and is not detected.

Figure 1C:
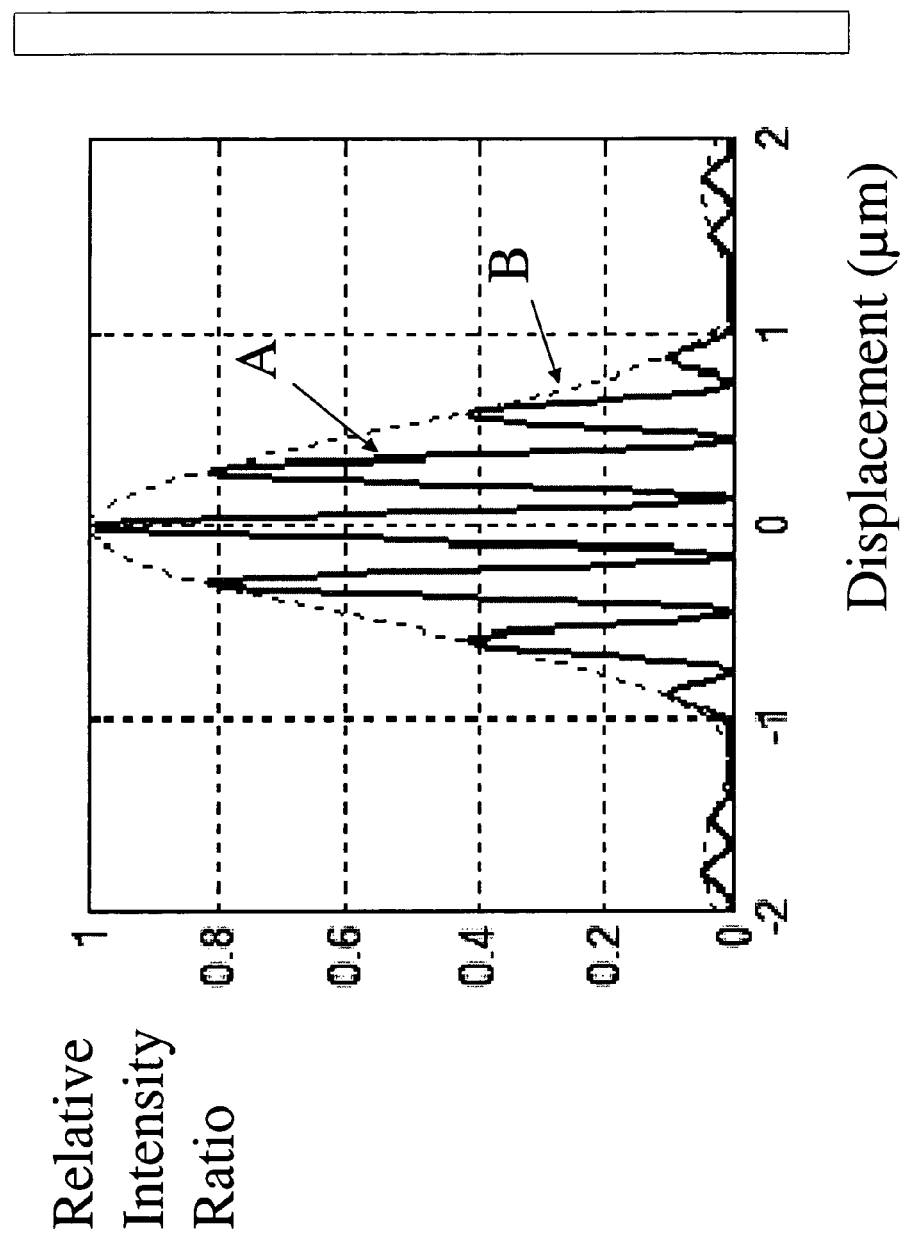
FIG. 1C is a plot diagram illustrating the relationship between the displacement and relative intensity of a light beam received at a detector of the confocal microscope shown in FIG. 1A.

FIG. 1C is a plot diagram illustrating the relationship between the displacement and relative intensity of a light beam received at the detector 15 of the confocal microscope 10 shown in FIG. 1A. Referring to FIG. 1C, for an in-focus situation where an object is located at a focal plane, the relative intensity ratio, i.e., the intensity of a received light beam to that of an incident light beam, is approximately 1, which may be used as a measurement threshold for the confocal microscope 10. For an out-of-focus situation where an object is located away from a focal plane, the relative intensity ratio decreases as the displacement increases.

Figure 2A:
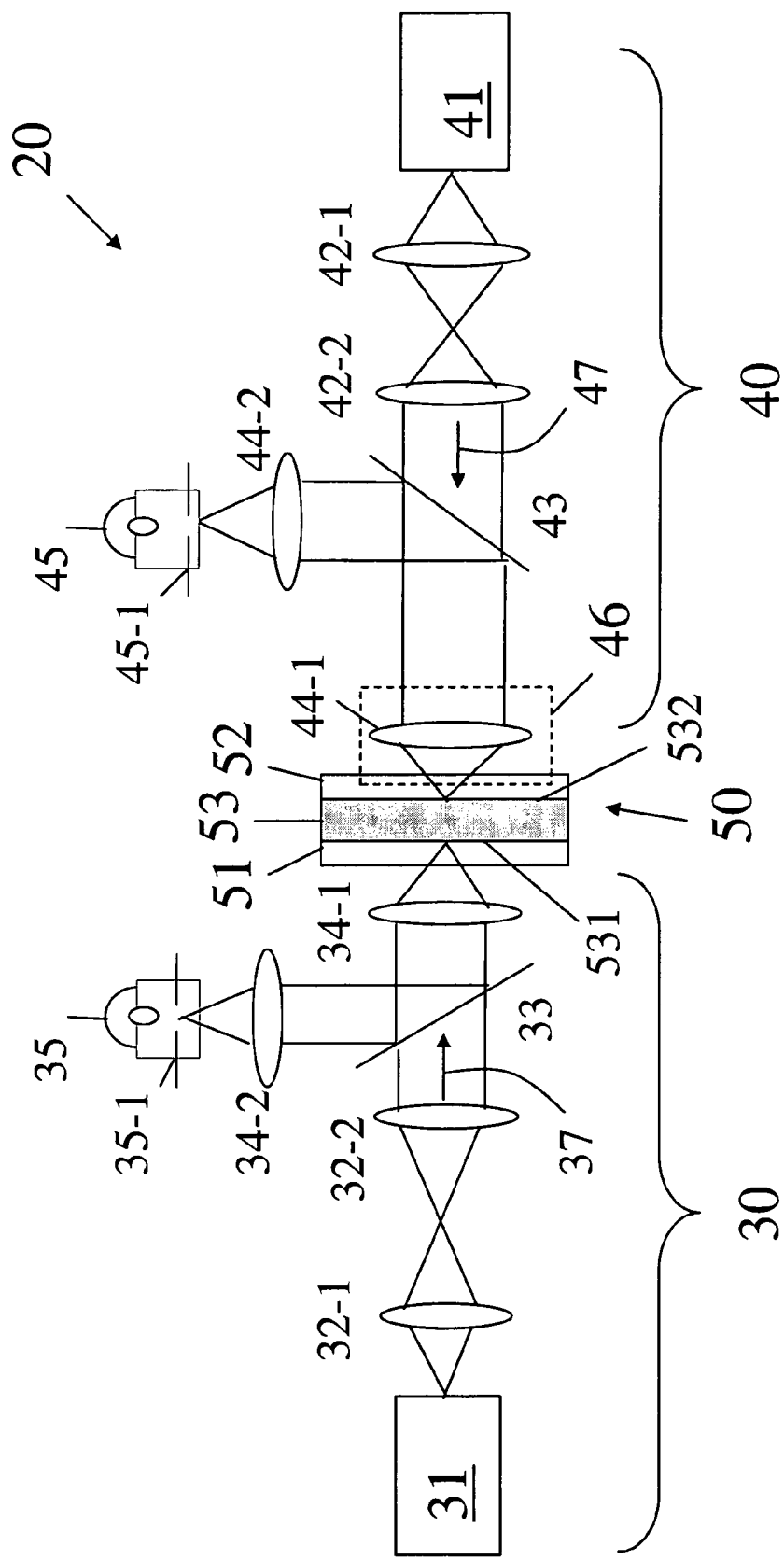
FIG. 2A is a schematic diagram of an optical measuring system in accordance with one embodiment of the present invention.

FIG. 2A is a schematic diagram of an optical measuring system 20 in accordance with one embodiment of the present invention. The optical measuring system 20 includes a first confocal microscope 30 and a second confocal microscope 40. The first confocal microscope 30, having a similar structure to the confocal microscope 10 illustrated in FIG. 1A, includes a light source 31, a first lens 32-1, a second lens 32-2, a beam splitter 33, a first objective lens 34-1, a second objective lens 34-2 and a detector 35 with a pinhole 35-1. The light source 31, first lens 32-1 and second lens 32-2 provide a first light beam in a first direction 37. The first light beam passes through the beam splitter 33 and is focused by the first objective lens 34-1 at a focal plane of the first objective lens 34-1. A reflected light beam is collected by the first objective lens 34-1 and reflected by the beam splitter 33 toward the detector 35 through the second objective lens 34-2 and pinhole 35-1.

In the same manner, the second confocal microscope 40, having a similar structure to the confocal microscope 10 illustrated in FIG. 1A, includes a light source 41, a first lens 42-1, a second lens 42-2, a beam splitter 43, a first objective lens 44-1, a second objective lens 44-2 and a detector 45 with a pinhole 45-1. The light source 41, first lens 42-1 and second lens 42-2 provide a second light beam in a second direction 47 substantially opposed to the first direction 37. The second light beam passes through the beam splitter 43 and is focused by the first objective lens 44-1 at a focal plane of the second objective lens 44-1. A reflected light beam is collected by the first objective lens 44-1 and reflected by the beam splitter 43 toward the detector 45 through the second objective lens 44-2 and pinhole 45-1. The second confocal microscope 40 further includes a sliding device 46 for moving the first objective lens 44-1 with respect to the light source 41 along an axis defined by the first direction 37 and second direction 47. In one embodiment according to the present invention, the first objective lens 44-1 is loaded on the sliding device 46 to move along the axis. Skilled persons in the art will understand that other device capable of adjusting the focus point of the first objective lens 44-1 along the axis may be used to replace the sliding device 46. Furthermore, the first confocal microscope 30 may include a device similar to the sliding device 46 for moving the first objective lens 34-1 along the axis.

Figure 2B:
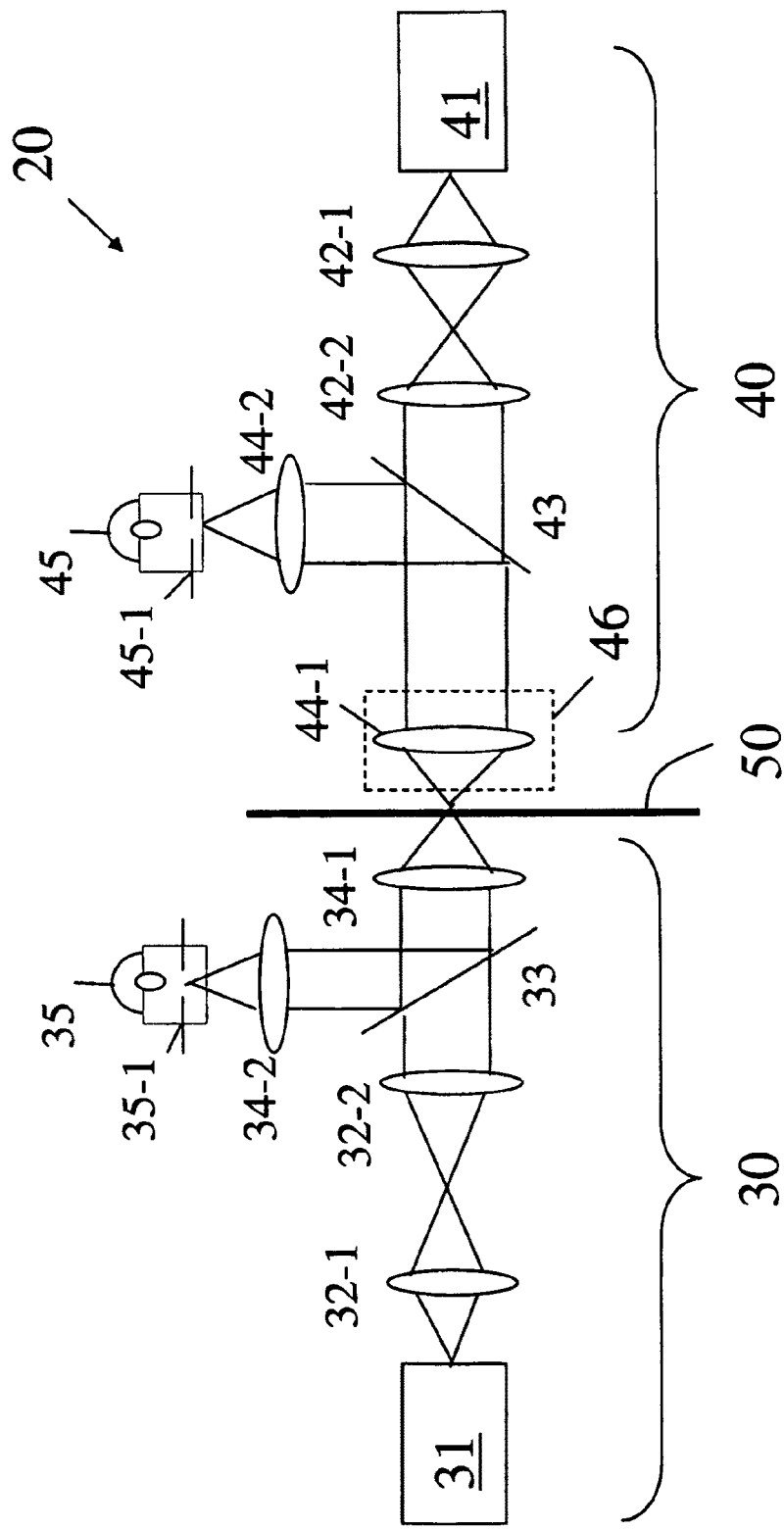
FIG. 2B is a schematic diagram illustrating a method for operating the optical measuring system in accordance with one embodiment of the present invention.

An object 50, for example, a liquid crystal cell, including a liquid crystal layer 53 sandwiched by transparent layers 51 and 52 such as glass substrates, is disposed between the first confocal microscope 30 and second confocal microscope 40. To measure the thickness of the object 50, or the cell gap of the liquid crystal cell, the relative position of the first confocal microscope 30 and the second confocal microscope 40 is reset. FIG. 2B is a schematic diagram illustrating a method for operating the optical measuring system 20 in accordance with one embodiment of the present invention. Referring to FIG. 2B, before positioning the object 50 between the first confocal microscope 30 and second confocal microscope 40, the second confocal microscope 40 is moved along the axis with respect to the first confocal microscope 30 till the focal plane of the first objective lens 34-1 overlaps the focal plane of the first objective lens 44-1 at a first position plane 48. The position of the sliding device 46 is then recorded.

Next, referring again to FIG. 2A, the object 50 is positioned between the first confocal microscope 30 and second confocal microscope 40. The object 50 is moved along the axis till a first interface 531 between the liquid crystal layer 53 and one transparent layer 51 overlaps the focal plane of the first objective lens 34-1. Next, the sliding device 46, on which the first objective lens 44-1 is loaded, is moved along the axis toward the light source 41 till a second interface 532 between the liquid crystal layer 53 and the other transparent layer 52 overlaps the focal plane of the first objective lens 44-1. The new position of the sliding device 46 is then recorded. The thickness of the object 50 is determined by the recorded positions of the sliding device 46.

Figure 3:
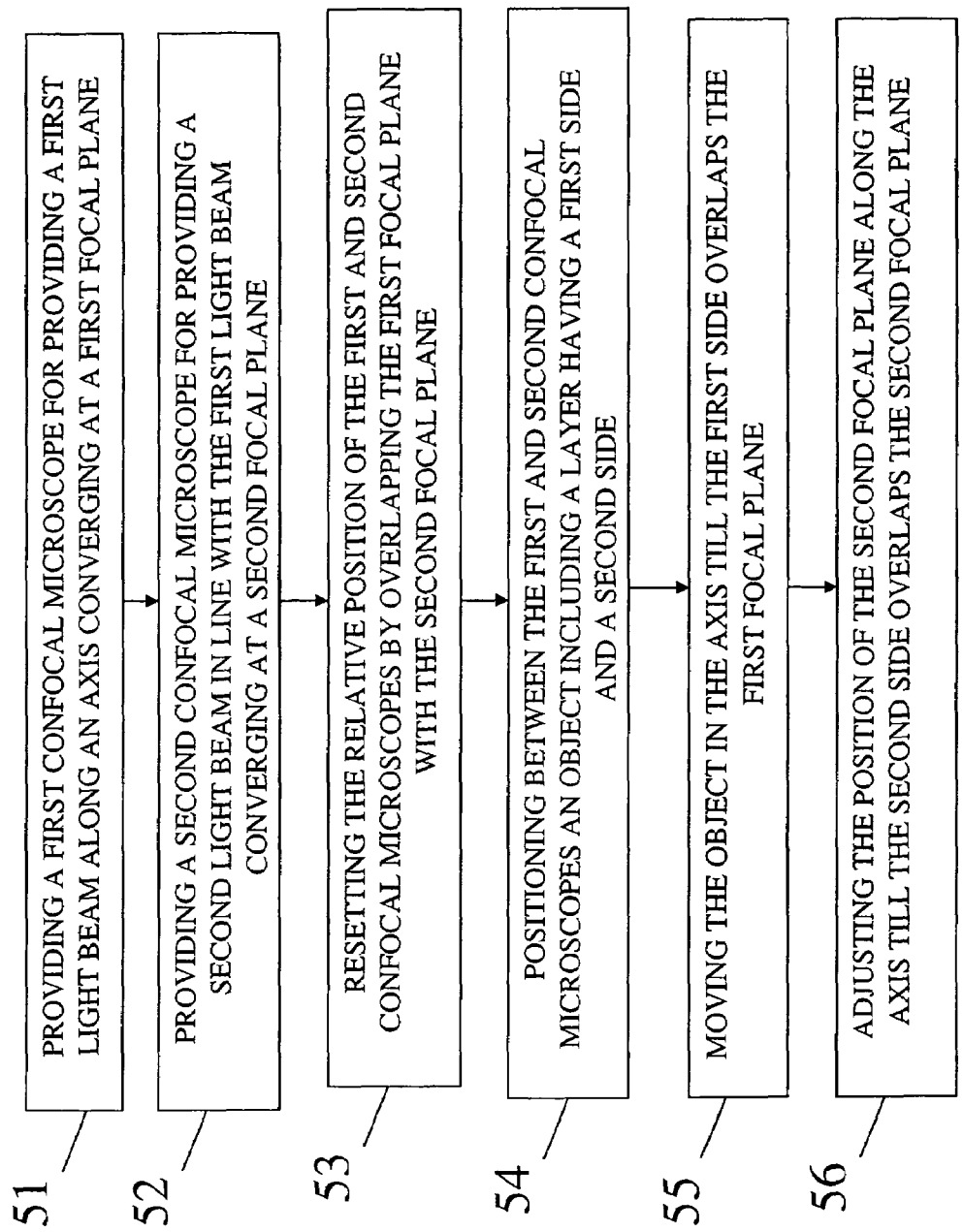
FIG. 3 is a flow diagram illustrating a method for thickness measurement in accordance with one embodiment of the present invention.

FIG. 3 is a flow diagram illustrating a method for thickness measurement in accordance with one embodiment of the present invention. Referring to FIG. 3, at step 51, a first confocal microscope is provided for providing a first light beam in a first direction along an axis converging at a first focal plane. At step 52, a second confocal microscope is provided for providing a second light beam along the axis converging at a second focal plane. The second light beam travels in a second direction substantially opposed to the first direction. Next, at step 53, the relative position of the first confocal microscope and the second confocal microscope is reset by moving the second confocal microscope along the axis till the first focal plane overlaps the second focal plane. When overlapped, a maximum relative intensity ratio is detected. The position of an objective lens of the second confocal microscope associated with the second focal plane is then recorded. At step 54, an object including a layer further including a first side and a second side is positioned between the first confocal microscope and the second confocal microscope. Next, at step 55, the object is moved along the axis till the first side overlaps the first focal plane. At step 56, the position of the second focal plane is adjusted by moving the objective lens associated with the second focal plane till the second side overlaps the second focal plane. The new position of the objective lens of the second confocal microscope is then recorded. The layer thickness of the object is determined from the recorded positions of the objective lens associated with the second focal plane.

Figure 4:
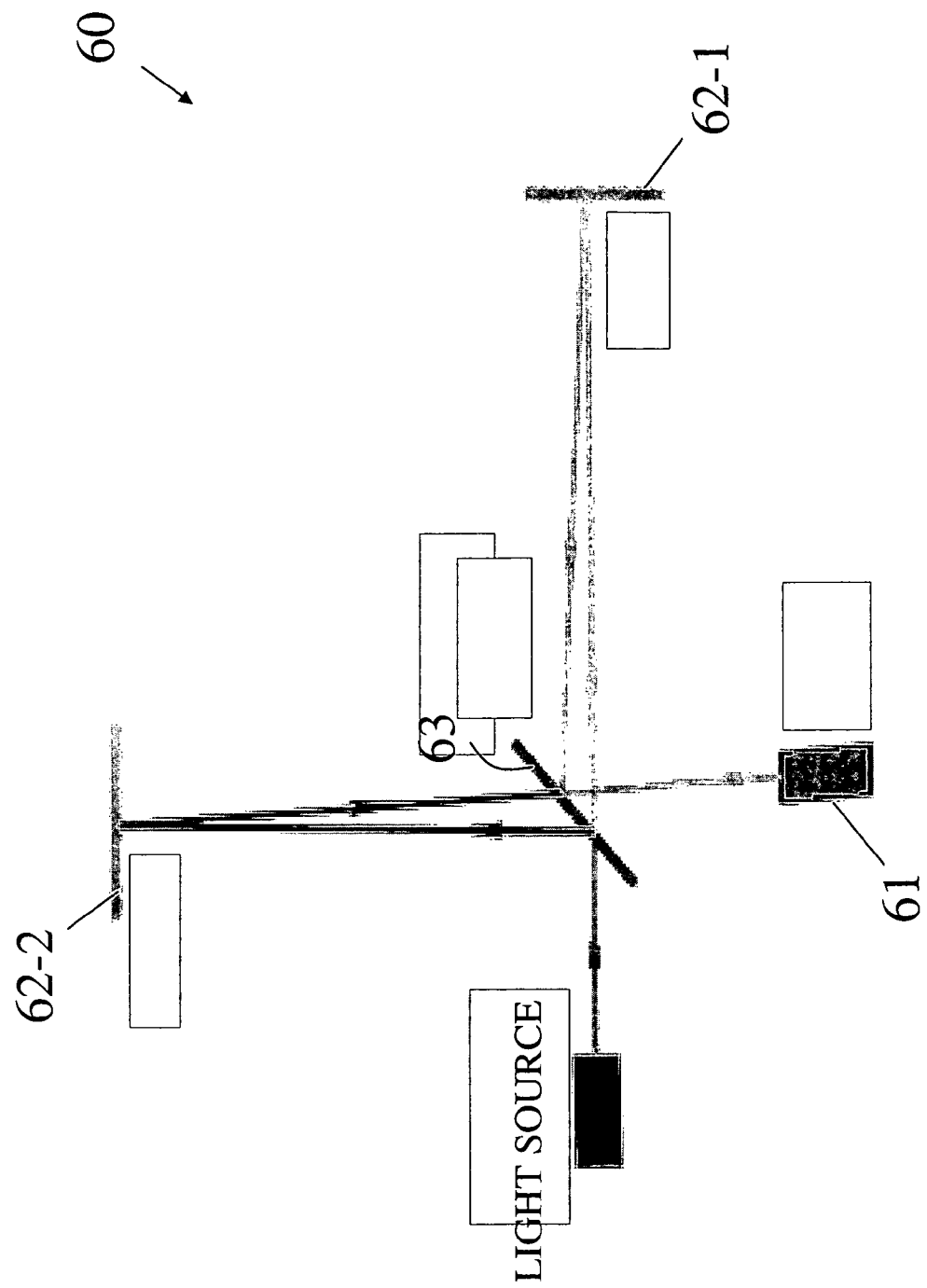
FIG. 4 is a schematic diagram of an interferometer suitable for use in the present invention.

FIG. 4 is a schematic diagram of an interferometer 60 suitable for use in the present invention. An interferometer works on the principle that two optical waves that coincide with the same phase will amplify each other while two optical waves that have opposite phases will cancel each other out. Referring to FIG. 4, the interferometer 60, for example, a Michelson interferometer, includes a detector 61, reflecting mirrors 62-1 and 62-2, and a beam splitter 63, which is usually a semitransparent mirror. There are two optical paths from a light source toward the detector 61. One reflects off the beam splitter 63, travels to one reflecting mirror 62-2 and then reflects back, goes through the beam splitter 63 to the detector 61. The other one travels through the beam splitter 63 to the other reflecting mirror 62-1, reflects back to the beam splitter 63, then reflects therefrom into the detector 61. If these two optical paths differ by a whole number (including 0) of wavelengths, there is constructive interference and a strong signal at the detector 61. If they differ by a whole number and a half wavelengths, there is destructive interference and a weak signal at the detector 61.

Figure 5:
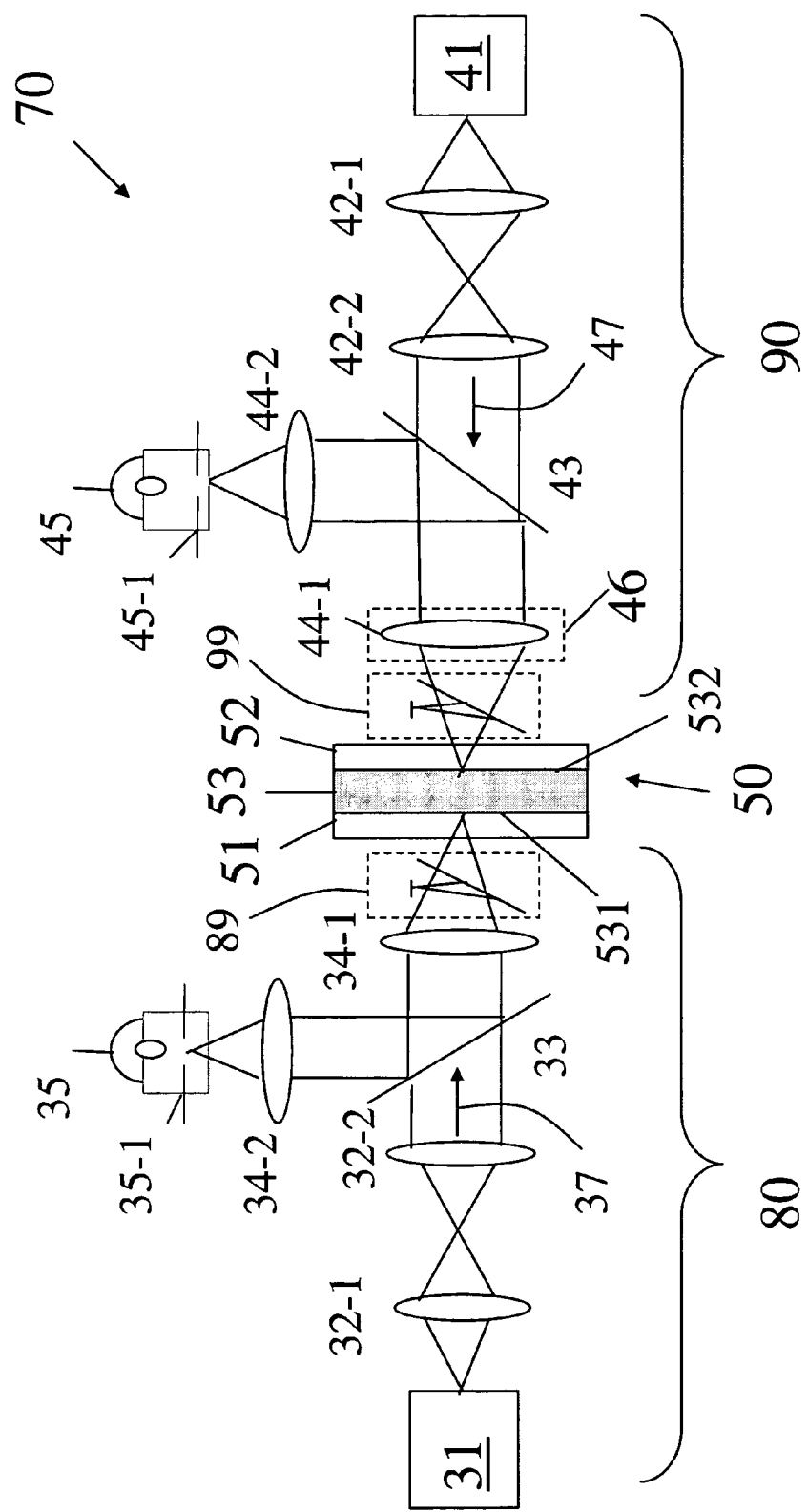
FIG. 5 is a schematic diagram of an optical measuring system in accordance with another embodiment of the present invention.

FIG. 5 is a schematic diagram of an optical measuring system 70 in accordance with another embodiment of the present invention. Referring to FIG. 5, the optical measuring system 70 has a similar structure to the optical measuring device 20 illustrated in FIG. 2A except that a first confocal microscope 80 includes an interferometer 89 and a second confocal microscope 90 includes an interferometer 99. The interferometer 89, which has a similar structure to the interferometer 60 illustrated in FIG. 4, is disposed between the first objective lens 34-1 and the focal plane of the first objective lens 34-1. In the same manner, the interferometer 99, which has a similar structure to the interferometer 60 illustrated in FIG. 4, is disposed between the first objective lens 44-1 and the focal plane of the first objective lens 44-1. With the interferometers 89 and 99, the sensitivity and resolution of the first confocal microscope 80 and second confocal microscope 90 may be increased. In one embodiment according to the present invention, the measurement threshold of the optical measuring system 70, also referring to FIG. 1C, is approximately 1, and the maximum slope of the plot A is greater than or equal to that of an envelop B. The maximum slope of the envelop B may occur at a section corresponding to the ratio ranging between 0.4 to 0.6.

Figure 6A:
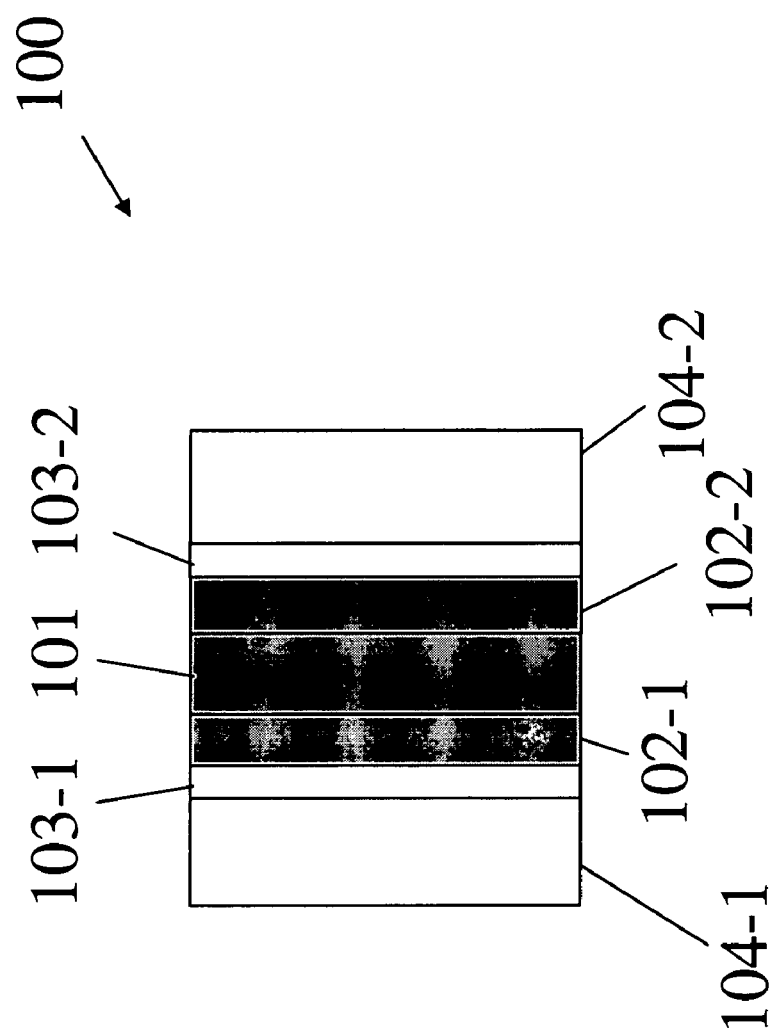
FIG. 6A is a schematic diagram of an object including multiple transparent layers.

FIG. 6A is a schematic diagram of an object 100 including multiple transparent layers. Referring to FIG. 6A, the object 100 includes a liquid crystal layer 101, a pair of alignment layers 102-1 and 102-2 sandwiching the liquid crystal layer 101, a pair of indium tin oxide ("ITO") layers 103-1 and 103-2 sandwiching the alignment layers 102-1 and 102-2, and a pair of glass substrates 104-1 and 104-2 sandwiching the ITO layers 103-1 and 103-2.

Figure 6B:
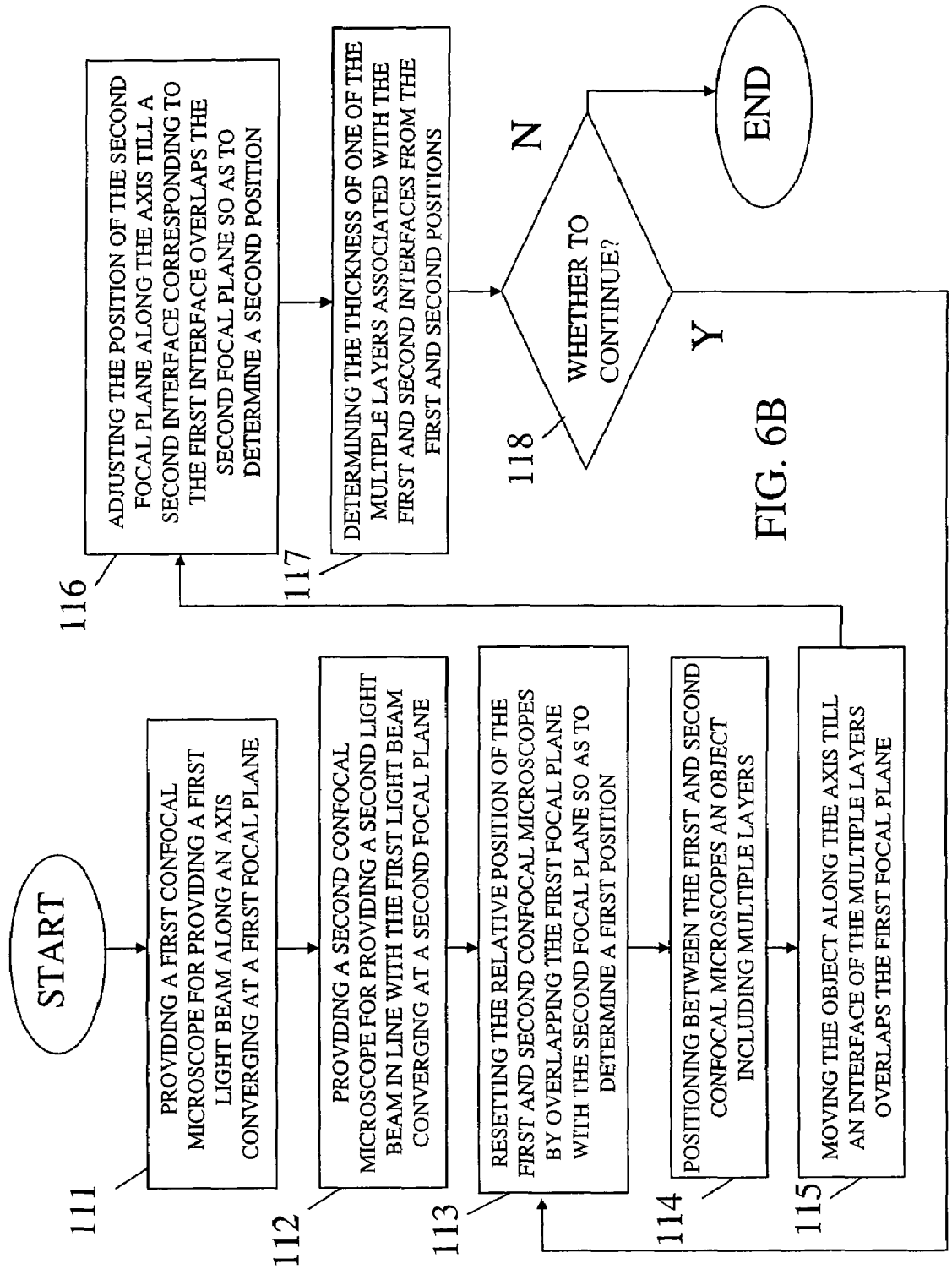
FIG. 6B is a flow diagram illustrating a method for measuring the thickness of the object shown in FIG. 6A in accordance with one embodiment of the present invention.

FIG. 6B is a flow diagram illustrating a method for measuring the thickness of the object 100 shown in FIG. 6A in accordance with one embodiment of the present invention. Referring to FIG. 6B, at step 111, a first confocal microscope is provided for providing a first light beam in a first direction along an axis converging at a first focal plane. At step 112, a second confocal microscope is provided for providing a second light beam along the axis converging at a second focal plane. The second light beam travels in a second direction substantially opposed to the first direction. Next, at step 113, the relative position of the first confocal microscope and the second confocal microscope is reset by moving the second confocal microscope along the axis till the first focal plane overlaps the second focal plane. The position of an objective lens of the second confocal microscope associated with the second focal plane is then recorded. At step 114, an object including multiple layers transparent to the first light beam and second light beam is positioned between the first confocal microscope and the second confocal microscope. Next, at step 115, the object is moved along the axis till a first interface of the multiple layers overlaps the first focal plane. The first interface includes a first side of the object. At step 116, the position of the second focal plane is adjusted by moving the objective lens associated with the second focal plane till a second interface corresponding to the first interface overlaps the second focal plane. The second interface includes a second side of the object. The new position of the objective lens of the second confocal microscope is then recorded. The thickness of a layer, for example, the liquid crystal layer, of the object is determined from the recorded positions of the objective lens associated with the second focal plane at step 117. Next, a step 118, it is determined whether to continue the measurement. If confirmative, the steps 113 to 117 are repeated for measuring the thickness of one of the remaining layers.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

We claim:
1. A method for thickness measurement, comprising:
   providing a first confocal microscope;
   emitting a first light beam from the first confocal microscope in a first direction;
   focusing the first beam at a first focal plane;
   providing a second confocal microscope;
   emitting a second light beam from the second confocal microscope in a second direction substantially opposed to the first direction;
   focusing the second beam at a second focal plane; and
   adjusting the relative position of the first and second microscopes by overlapping the first and second focal planes.
2. The method of claim 1, further comprising positioning an object between the first and second confocal microscopes including at least one layer.

3. The method of claim 2, further comprising moving the object in an axis defined by the first and second directions till a first interface of the at least one layer overlaps the first focal plane.

4. The method of claim 1, further comprising recording the position of an objective lens associated with the second focal plane.

5. The method of claim 3, further comprising moving an objective lens associated with the second focal plane along the axis till a second interface of the at least one layer corresponding to the first interface overlaps the second focal plane.

6. The method of claim 5, further comprising recording the position of the objective lens when the second interface overlaps the second focal plane.

7. The method of claim 1, further comprising providing a device for loading one of a first objective lens associated with the first focal plane or a second objective lens associated with the second focal plane.

8. The method of claim 7, further comprising moving the device along an axis defined by the first and second directions.

9. The method of claim 7, further comprising:
moving the object along the axis till a first interface of the at least one layer overlaps the first focal plane; and
recording the position of the device when the first interface of the at least one layer overlaps the first focal plane.

10. The method of claim 7, further comprising:
moving the device along the axis till a second interface of the at least one layer overlaps the second focal plane; and
recording the position of the device when the second interface of the at least one layer overlaps the second focal plane.

11. A method for thickness measurement, comprising:
providing a first confocal microscope including a first objective lens;
emitting a first light beam from the first confocal microscope in a first direction;
focusing the first beam at a first focal plane of the first objective lens;
providing a second confocal microscope including a second objective lens;
emitting a second light beam from the second confocal microscope in a second direction substantially opposed to the first direction;
focusing the second beam at a second focal plane of the second objective lens, wherein the second focal plane overlaps the first focal plane; and
providing an object including at least one layer.

12. The method of claim 11, further comprising positioning the object between the first and second confocal microscopes.

13. The method of claim 11, further comprising moving the object in an axis defined by the first and second directions till a first interface of the at least one layer overlaps the first focal plane.

14. The method of claim 11, further comprising recording the position of the second objective lens.

15. The method of claim 13, further comprising moving the second objective lens along the axis till a second interface of the at least one layer corresponding to the first interface overlaps the second focal plane.

16. The method of claim 15, further comprising recording the position of the second objective lens when the second interface overlaps the second focal plane.

17. The method of claim 11, further comprising providing a device for loading one of the first objective lens or the second objective lens.

18. The method of claim 17, further comprising moving the device along an axis defined by the first and second directions.

19. The method of claim 17, further comprising:
moving the object along the axis till a first interface of the at least one layer overlaps the first focal plane; and
recording the position of the device when the first interface of the at least one layer overlaps the first focal plane.

20. The method of claim 17, further comprising:
moving the device along the axis till a second interface of the at least one layer overlaps the second focal plane; and
recording the position of the device when the second interface of the at least one layer overlaps the second focal plane.

21. The method of claim 11, further comprising positioning an interferometer between the first objective lens and the first focal plane.

22. The method of claim 11, further comprising positioning an interferometer between the second objective lens and the second focal plane.

* * * * *